US008719847B2

(12) United States Patent
Agarwal et al.

(10) Patent No.: US 8,719,847 B2
(45) Date of Patent: May 6, 2014

(54) MANAGEMENT AND MARKETPLACE FOR DISTRIBUTED HOME DEVICES

(75) Inventors: Sharad Agarwal, Seattle, WA (US); Paramvir Bahl, Bellevue, WA (US); Alice Jane Bernheim Brush, Redmond, WA (US); Colin Kimm Dixon, Seattle, WA (US); Bongshin Lee, Issaquah, WA (US); Ratul Mahajan, Seattle, WA (US); Stefan Saroiu, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 260 days.

(21) Appl. No.: 12/891,299

(22) Filed: Sep. 27, 2010

(65) Prior Publication Data

US 2012/0079507 A1   Mar. 29, 2012

(51) Int. Cl.
*G06F 3/00* (2006.01)
(52) U.S. Cl.
USPC ............ 719/321; 719/311; 719/313; 719/318
(58) Field of Classification Search
None
See application file for complete search history.

(56) References Cited

U.S. PATENT DOCUMENTS

| | | | |
|---|---|---|---|
| 6,915,521 B1 * | 7/2005 | Monteiro ...................... 719/313 |
| 6,970,869 B1 * | 11/2005 | Slaughter et al. ............. 719/311 |
| 7,788,665 B2 * | 8/2010 | Oshins .......................... 719/321 |
| 2003/0081745 A1 | 5/2003 | Ito et al. |
| 2004/0044727 A1 * | 3/2004 | Abdelaziz et al. ............ 709/203 |
| 2005/0097543 A1 * | 5/2005 | Hirayama .................... 717/168 |
| 2007/0206740 A1 * | 9/2007 | Iggulden et al. ......... 379/102.03 |
| 2007/0258443 A1 * | 11/2007 | Chamdani et al. ............ 370/386 |
| 2008/0037485 A1 * | 2/2008 | Osinga et al. ................. 370/338 |
| 2009/0299541 A1 * | 12/2009 | Park et al. ..................... 700/295 |
| 2010/0095107 A1 * | 4/2010 | Smith et al. ................... 713/150 |

OTHER PUBLICATIONS

"An Implementation of the Broadband Home Gateway supporting Multi-Channel IPTV service", Park, 2006, pp. 1-5.*
"A Generic Network Management Architecture targeted to support home automation networks and home internet connectivity", Topalis, pp. 1-8.*
Bregman, et al., "A Universal Implementation Model for the Smart Home", Retrieved at << http://www.sersc.org/journals/IJSH/vol3_no3_2009/2.pdf >>, International Journal of Smart Home, vol. 3, No. 3, Jul. 2009, pp. 15-30.

(Continued)

*Primary Examiner* — Tuan Dao
(74) *Attorney, Agent, or Firm* — Steve Wight; Carole Boelitz; Micky Minhas (57) ABSTRACT

A home device management technique is described that allows a user to manage a network of distributed home devices. Special application modules, driver modules, and service exchange ports are employed. Each application modules implements some functionality in the home, preferably using one or more devices in the home distributed system. Each driver module provides the logic for operating one or multiple distributed home devices and is capable of receiving commands from application modules and sending them to devices, detecting events for an associated type of home device, translating the detected event into a format usable by the application modules and notifying the application modules of the events. Events are communicated between the application modules and the driver modules by using one or more service exchange ports. Access control policies are employed to control access to the home devices. The application and driver modules can be obtained over a network from a home marketplace that can also determine their compatibility and interoperability with the home devices.

20 Claims, 6 Drawing Sheets

(56) References Cited

OTHER PUBLICATIONS

"Control 4 Annouces New App Store for Home Automation", Retrieved at << http://hometheaterreview.com/control-4-annouces-new-app-store-for-home-automation >>, Jan. 13, 2010, pp. 2.

Rosen, et al., "HomeOS: Context-Aware Home Connectivity", Retrieved at << http://citeseerx.ist.psu.edu/viewdoc/download?doi=10.1.1.67.9734&rep=rep1&type=pdf >>, Proceedings of the International Conference on Pervasive Computing and Communications (PCC'04), Jun. 21-24, 2004, pp. 6.

Zoref, et al., "Networking Mobile Devices and Computers in an Intelligent Home", Retrieved at << http://www.opcat.com/docs/NetworkingMobileDevicesandComputersinanIntelligentHome.pdf >>, International Journal of Smart Home, vol. 3, No. 4, Oct. 2009, pp. 15-22.

Wang, et al., "Design and Realization of Remote Control in Smart Home System", Retrieved at << http://ieeexplore.ieee.org/stamp/stamp.jsp?tp=&arnumber=5076801 >>, ICCSN, Proceedings of the 2009 International Conference on Communication Software and Networks, Feb. 27-28, 2009, pp. 13-15.

Cherry, Neil., "Controlling Your Linux Smart Home with X10", Retrieved at << http://www.dummies.com/how-to/content/controlling-your-linux-smart-home-with-x10.html >>, Retrieved Date: Jul. 29, 2010, pp. 3.

Ashley., "Windows-Based Kitchen Client Coming Soon?", Retrieved at << http://cybernetnews.com/windows-based-kitchen-client-coming-soon/ >>, Jun. 7, 2007, pp. 6.

"Home Security Systems, Home Security Products, Home Alarm Systems—ADT", Retrieved at << http://www.adt.com/ >>, Retrieved Date: Jul. 28, 2010, pp. 1.

Bauer, et al., "A User Study of Policy Creation in a Flexible Access-Control System", Retrieved at << http://www.robreeder.com/pubs/greyCHI2008.pdf >>, Conference on Human Factors in Computing Systems, Proceeding of the twenty-sixth annual SIGCHI conference on Human factors in computing systems, Apr. 5-10, 2008, pp. 10.

"Open Source—Apple Developer", Retrieved at << http://developer.apple.com/opensource/ >>, Retrieved Date: Jul. 28, 2010, pp. 2.

Borchers, et al., "Stanford Interactive Workspaces: A Framework for Physical and Graphical User Interface Prototyping", Retrieved at <<http://citeseerx.ist.psu.edu/viewdoc/download;jsessionid=A5261D6880D4BAE84E45B952F8DFED7A?doi=10.1.1.11.9865&rep=rep1&type=pdf >>, IEEE Wireless Communications, vol. 09, No. 6, Dec. 2002, pp. 13.

Brumitt, et al., "EasyLiving: Technologies for Intelligent Environments", Retrieved at << http://citeseerx.ist.psu.edu/viewdoc/download?doi=10.1.1.33.9414&rep=rep1&type=pdf >>, Lecture Notes in Computer Science, Proceedings of the 2nd international symposium on Handheld and Ubiquitous Computing, Sep. 25-27, 2000, pp. 15.

Calvert, et al., "Moving Toward the Middle: The Case against the End-to-End Argument in Home Networking", Retrieved at << http://citeseerx.ist.psu.edu/viewdoc/download?doi=10.1.1.118.4378&rep=rep1&type=pdf >>, In Proceedings 6th ACM Workshop on Hot Topics in Networks (Hotnets-VI), Nov. 2007, pp. 1-6.

Chaudhuri, et al., "EON: Modeling and Analyzing Dynamic Access Control Systems with Logic Programs", Retrieved at << https://research.microsoft.com/pubs/74556/ccs2008.pdf >>, Conference on Computer and Communications Security, Proceedings of the 15th ACM conference on Computer and communications security, Oct. 27-31, 2008, pp. 10.

"Control4 Home Automation and Control", Retrieved at << http://www.control4.com >>, Retrieved Date: Jul. 28, 2010, pp. 2.

"DLNA", Retrieved at << http://www.dlna.org/home >>, Retrieved Date: Jul. 28, 2010, pp. 1.

Edwards, et al., "Using SpeakEasy for Ad Hoc Peer-to-Peer Collaboration", Retrieved at << http://www2.parc.com/csl/members/smetters/publications/casca.pdf >>, Computer Supported Cooperative Work, Proceedings of the 2002 ACM conference on Computer supported cooperative work, Nov. 16-20, 2002, pp. 11.

Greenberg, et al., "A Clean Slate 4D Approach to Network Control and Management", Retrieved at << http://www.cs.cmu.edu/~4D/papers/greenberg-ccr05.pdf >>, ACM SIGCOMM Computer Communication Review, vol. 35, No. 5, Oct. 2005, pp. 12.

Grinter, et al., "The Ins and Outs of Home Networking: The Case for Useful and Usable Domestic Networking", Retrieved at << http://www.cc.gatech.edu/~keith/pubs/tochi-homenet.pdf >>, ACM Transactions on Computer-Human Interaction (TOCHI), vol. 16, No. 2, Jun. 2009, pp. 8:1-8:22.

Gude, et al., "NOX: Towards an Operating System for Networks", Retrieved at << http://www.cs.yale.edu/homes/jf/nox.pdf >>, ACM SIGCOMM Computer Communication Review, vol. 38, No. 3, Jul. 2008, pp. 6.

Mazurek, et al., "Access Control for Home Data Sharing: Attitudes, Needs and Practices", Retrieved at << http://www.pdl.cmu.edu/PDL-FTP/Storage/CMU-PDL-09-110.pdf >>, CMU-PDL-09-110, Oct. 2009, pp. 17.

Rashid, et al., "Accent: A Communication Oriented Network Operating System Kernel", Retrieved at << http://citeseerx.ist.psu.edu/viewdoc/download?doi=10.1.1.91.5811&rep=rep1&type=pdf >>, ACM Symposium on Operating Systems Principles, Proceedings of the eighth ACM symposium on Operating systems principles, Dec. 14-16, 1981, pp. 64-75.

"Schlage LiNK", Retrieved at << http://link.schlage.com/ >>, Retrieved Date: Jul. 28, 2010, pp. 2.

Efstathopoulos, et al., "Labels and Event Processes in the Asbestos Operating System", Retrieved at <<http://pdos.csail.mit.edu/papers/asbestos-sosp05.pdf >>, ACM Symposium on Operating Systems Principles, Proceedings of the twentieth ACM symposium on Operating systems principles, Oct. 23-26, 2005, pp. 1-14.

Zeldovich, et al., "Securing Distributed Systems with Information Flow Control", Retrieved at << http://www.scs.stanford.edu/~nickolai/papers/zeldovich-dstar.pdf >>, Proceedings of the 5th USENIX Symposium on Networked Systems Design and Implementation, Apr. 16-18, 2008, pp. 1-16.

Z-Wave, Retrieved at << http://www.z-wave.com >>, Retrieved Date: Jul. 28, 2010, pp. 1.

\* cited by examiner

MANAGEMENT AND MARKETPLACE FOR DISTRIBUTED HOME DEVICES

BACKGROUND

The vision of a smart, connected home has been around for over a decade. In this vision, users easily perform tasks involving diverse sets of devices connected to their home network without the need for painstaking configuration and custom programming. For example, a home with remotely controllable lights, cameras, windows, and door locks is envisioned. It should be easy to set up this home to automatically adjust windows and lights based on the outside temperature and lighting or to remotely determine a visitor at the front door and potentially open the door. While modern homes have many of these technological home devices, applications which coordinate such devices to accomplish cross-device tasks have yet to appear in any significant numbers.

Homes differ in terms of not only their devices and interconnectivity, but also user preferences for how various activities should be conducted. Application developers for home devices such as lighting systems, security systems, and audio visual systems are thus not only plagued by having to support many distinct devices, but also to build a configuration flexible enough to meet the demands of a majority of users. Thus, it should come as no surprise that there are few applications for the home today, save those provided by the vendors of specific devices. But vendor applications seldom provide cross-device capabilities and typically only provide access to a single device. For instance, electronic locks come with custom software. Such vertical integration by individual vendors can provide a more reliable experience to users but discourages the integration of multiple devices to perform various functions.

Current approaches for enabling cross-device tasks fall on the two ends of a spectrum. At one end are the efforts to improve basic device interoperability through standards and research efforts. However, device interoperability alone is insufficient. Applications also need to support user preferences and coordinate device access. For instance, a security task may want to keep the windows closed at the same time as an energy conservation task wants to open them. Interoperability itself does not provide mechanisms to resolve such conflicts. At the other end of the spectrum are monolithic systems that tightly integrate multiple devices for specific cross-device tasks. They include commercial security systems and research efforts. However, such systems are hard to extend (especially for users) with new devices or tasks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The home device management technique described herein provides the ability for users to manage an ensemble of distributed home devices in a home environment, such as, for example, personal computers, game consoles, televisions, cameras, security systems, lighting systems and the like, on a home network. In one embodiment, the technique employs special application modules, driver modules and service exchange ports to allow users to effortlessly manage the devices on their home network with a single user interface. Each application module implements some functionality in the home, preferably using one or more devices in the home's distributed system. Each driver module provides the logic for operating one or multiple home devices in the distributed home device network and is capable of receiving commands from application modules and sending them to devices if needed, detecting events for an associated type of home device, translating the detected event into a format usable by the application modules and notifying the application modules of the events. For example, a television driver module is able to interface with and operate any type of television. Events between the application modules and the driver modules are communicated using one or more service exchange ports, each service exchange port interfacing with either an application module or a driver module to control multiple home devices of the distributed home device system as desired by a user. Some application modules may not interface with a device. For example, a face recognition module employed by the technique may be used by the technique, but it might not interface with a specific device. The technique also uses access control policies to control access by the application modules (and users) to one or more of the home devices.

The application modules and the driver modules for the home devices can be obtained from a home marketplace (for example, over a network). The home marketplace can also determine the compatibility and interoperability of multiple home devices, as well as to determine the compatibility and interoperability of application modules, driver modules, and home devices.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the home device management technique, reference is made to the accompanying drawings, which form a part thereof, and which show by way of illustration examples by which the home device management technique described herein may be practiced. It is to be understood that other embodiments may be utilized and structural changes may be made without departing from the scope of the claimed subject matter.

1.0 Home Device Management Technique

The following sections provide an overview of the home device management technique, as well as exemplary architectures and a process for employing the technique. Details for exemplary embodiments of the technique as well as one specific exemplary implementation are also provided.

1.1 Overview of the Technique

The home device management technique described herein employs a new approach to organizing and managing home devices in a home. By masking heterogeneity across homes (e.g., differences in home devices) through appropriate abstractions, the home device management technique can greatly simplify application development. Further, users can manage their home as a connected ensemble by specifying their access control preferences globally as well as enabling new capabilities by installing new applications or devices. The home device management system, in one embodiment, is also coupled with a home marketplace. This home marketplace helps users find applications that are compatible with the devices on their home network and find devices to enable desired tasks that cannot be supported by devices already in the home.

In one embodiment of the home device management technique, a home device management application runs on an appliance in the home that is preferably always on. Such an appliance could be, for example, a home server or other computing device. Application modules implement some functionality in the home, preferably using one or more devices in the home distributed system, while driver modules abstract low level details of an associated type of home device (e.g., a television) and the connection between the devices. Service exchange ports are used to communicate between the home devices and the driver and application modules. In another embodiment, an application module or parts thereof, run on a server in the cloud (e.g., on a server on the Internet or in a datacenter and the application(s) interact with the home over an Internet connection to the home. In yet another embodiment, the execution of applications and drivers is spread amongst various devices in the home (e.g., gaming console, server, laptop), some of which can turn off or leave the home.

The home device management application determines a list of the application and driver modules and the service exchange ports the application and driver modules have. In addition, the home device management application also determines the services the service exchange ports provide, as well as provides a mechanism to invoke and/or subscribe to device operations. An application module subscribes to notifications of certain events of the devices it controls. Communication between the drivers and the application modules are via the service exchange ports. In one embodiment a subscription to a notification of events employs four parameters: the operation to subscribe to, the service exchange port which would like notifications, a parameter that proves the subscription request is allowed and a parameter that allows the notifications to be sent back. The device driver talks to the device over whatever protocol the device communicates in. The application module can also issue requests. A request or query is just an operation invocation. The module invoking the operation sends a request for the operation it would like to invoke along with the parameters necessary to invoke the operation. The receiving module performs the operation and then sends back the corresponding return values (i.e., typed output values).

In one embodiment, home devices can directly communicate with each other (for example, a DLNA-capable network TV directly connected with a media server) and when communication is allowed (e.g., access is not prohibited) data streams flow directly between them. The logical operations are effectively centralized by the home device management application by the driver modules that logically interface each home device to the home device management application, independent of network topology. From the perspective of application modules, designed to use the functionality of one or more home devices, all devices are directly connected to the home device management application. This perspective greatly simplifies application development. Conventional control of devices (e.g., turning off a light switch) is still permitted; drivers detect and notify interested applications of such events.

The home device management technique can work with existing home devices, as long a driver module can communicate with them. Any protocol, including custom protocols or standards, may be spoken between a driver module and its devices. Furthermore, driver modules may be written by device vendors or independent developers.

One exemplary embodiment of the home device management technique is built on a modern language runtime framework (e.g., .NET framework). In this embodiment, all application modules and driver modules are implemented in a type-safe manner.

Running driver and application modules; using a "service exchange port" abstraction for exposing functionality and communication; and enforcing access control for users and modules will be described in greater detail below.

1.1.1 Modules

Both drivers (that interface with the home devices and detect and notify applications of events occurring with the devices) and applications (that implement some functionality preferably using the home devices), are modules in the home device management application. In one embodiment of the technique application and driver modules are isolated so that a poorly written module cannot impact the home device management application or other modules. To achieve isolation along with performance that is adequate for interactive use, one embodiment of the technique uses a lightweight isolation boundary called "application domain" provided by the home device management application. In this embodiment direct interaction is not allowed across domains, and only typed objects can be communicated through pre-defined entry points. The overhead of this communication is much lower than communication across processes in present day operating systems.

1.1.2 Service Exchange Ports

Modern operating systems have a variety of communication abstractions such as pipes, signals, sockets, shared memory, and more. Instead of supporting all of these, the home device management technique employs a specialized port, a "service exchange port," which allows typed messages to be exchanged. A service exchange port is an access point to an application module or driver module that exchanges services with other modules and/or the home device management application. A service exchange port is not equivalent to a conventional network port such as, for example, a TCP port associated with an IP address. A service exchange port can be queried for its functional description and location (e.g., living room). An application module or driver module that wants to expose certain functionality registers a service exchange port or ports with the home device management application. The home device management application then maintains a list or table of all registered service exchange ports that can be queried by other driver and application modules. Driver and application modules can query for registered service exchange ports and decide which ones they want to use.

Unless access is restricted (because of access control policies as described below), driver modules (and optionally application modules) can send and receive messages from a service exchange port to use their functionality.

Figure 1:
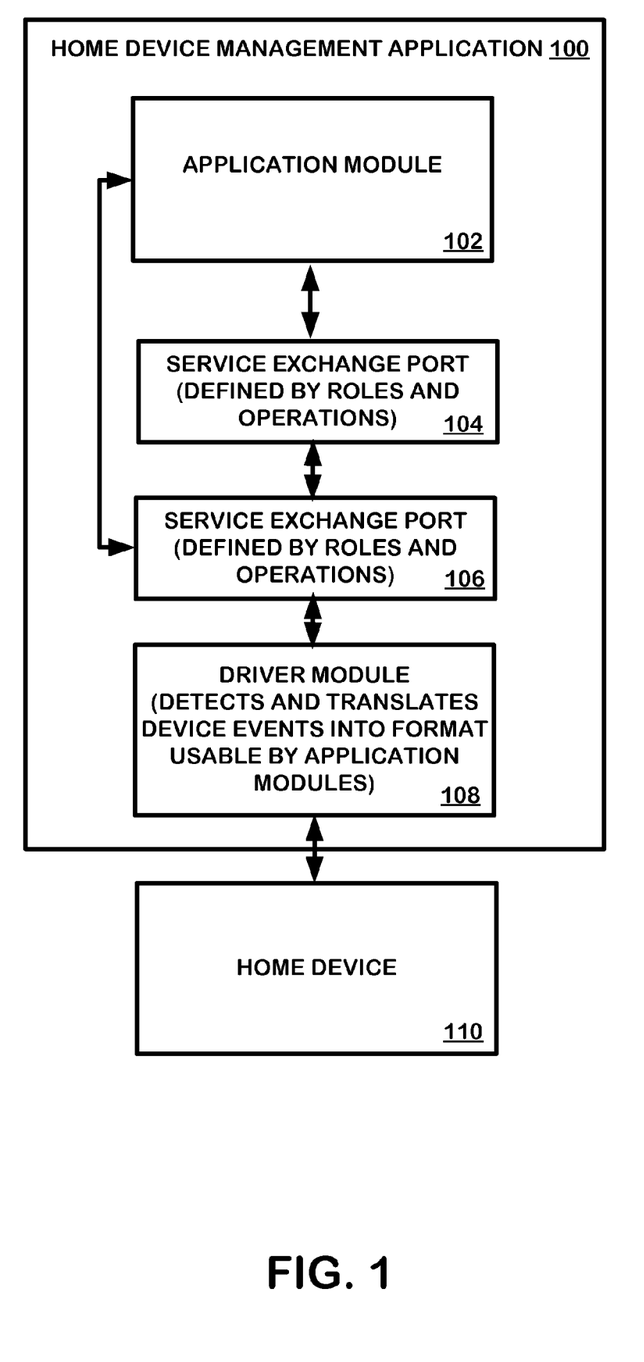
FIG. 1 is an exemplary architecture of the one exemplary interface between an application module and a home device according to the home device management technique described herein.

FIG. 1 provides an exemplary schematic of how an application module 102 might interface with a home device 110 via service exchange ports 104, 106 and a driver module 108. As shown in FIG. 1, an application module 102 (which provides the logic for completing one or more tasks using one or more home devices 110) may interface with its own service exchange port 104, or directly with a service exchange port 106 of a driver module 108. The service exchange ports 104 and 106 are defined by roles and operations, which will be discussed in greater detail below. The driver module 108 detects and translates device events into a format usable by the application module. More specifically, the driver module 108 receives commands from the application module and sends the received commands to the home device 110. It also detects events for the home device 110, translates the detected events into a format usable by the application module 102 and notifies the application module of the events. Due to the use of the service exchange ports 104, 106 and the driver module 108, it appears to the home device 110 that the device is directly connected to the home device management application 100, regardless of the network topology.

Service exchange ports belonging to driver modules and (optionally) application modules export services. A service is a list of named operations. Each operation has a list of named, typed input parameters and named, typed return values as well as a bit which defines (in combination with the access control policy) if a module can subscribe to the port.

In one embodiment of the technique, service exchange ports are functionally described in terms of "roles" and "operations." Roles are text strings that express a general functionality, while operations are actions a service exchange port can carry out, complete with typed inputs and outputs. For instance, the functionality of a dimmer can be described via its associated service exchange port or ports as <roles="lightswitch", "dimmerswitch">, <operations=("setOnOff", input=(boolean), output=( )), ("getOnOff", input=( ), output=(boolean), notify), ("setIntensity", input=(integer: 0-99), output=( )), ("getIntensity", input=( ), output=(integer: 0-99), notify)>. The functionality of this dimmer switch is exchanged through the service exchange port. This service exchange port supports four operations, two to turn the light on or off and set the dimmer level and two to query as to whether the light is on or off as well as what its current dimmer level is. Further, the query operations explicitly support notification, meaning an application can subscribe to changes in their return values. As a second example, a service exchange port exporting face-recognition functionality might have an operation ("recognizeFace", input=(image), output= (string)) which would take in a picture and return the name of the person's face recognized in the image if there is one.

Each service exchange port can be read, written, and subscribed to for value changes by modules by sending appropriate messages.

The home device management application does not need to understand the semantics of a service exchange port's functionality; only modules that want to use it need this ability. Thus, only camera-based applications need to understand the functional description of cameras. New devices or device features can be supported by adding roles or controls to the functional description, without modifying the home device management application at all.

1.1.3 Access Control

In one embodiment the home device management technique provides access control to devices, incorporating a notion of time, so that users can restrict access to certain devices, for instance, at night. The home device management application also treats application modules as first-order security principals, so that an application module can be restricted from accessing certain resources, independent of the user that activates it. Further, the home device management technique provides users with an easily understood view of security settings. In one embodiment, the home device management technique formulates access control policies as Datalog relationships based on applications, devices, users, and time. Datalog is a known query language for deductive databases. The use of Datalog (and the absence of complex primitives such as dynamic delegation) means that access verifications are simple (and fast) queries. The home device management application can easily provide users, with other Datalog queries, with different desired perspectives on their policies, e.g., a list of applications that can ever access the door lock. In one embodiment the home device management technique provides access control policies that are Datalog rules of the form (p, g, m, $T_{ws}$, $T_{we}$, pri, a, $T_s$, $T_e$), which states that service exchange port p can be accessed by users in group g, using module m, in time window from $T_{ws}$ (time window start) to $T_{we}$ (time window end) with priority pri and access mode a, with the rule becoming operational at time $T_s$ and expiring at $T_e$. Time window is modulo a week long period, so users can specify recurring policies by which something is allowed, for instance, on Sundays 7-9 PM. $T_s$ and $T_e$ are absolute times when the rule should be activated and deactivated. They are used to grant temporary access, e.g., to guests. Groups such as, for example, "kids" and "parents" are defined separately. Priorities are used to resolve conflicting access to the same port.

In one embodiment of the technique, access mode is one of "grant" (e.g., grant access), "ask user" (e.g., ask user for access), and "grant but notify admin" (e.g., grant access but notify administrator of granted access). Any access that is not explicit in the rule database is not allowed. While installing a module, users specify what it can access, when, and how (which can be changed later).

To simplify this process, application and driver modules suggest what they need. The application module specifies what type of devices (e.g., television, camera) that the application needs access to. When the application module is installed, it enumerates the different devices that are of type television or type camera, for example, and the technique can present that default list to a user for approval.

There is great value in expressing access control as Datalog rules. Evaluating access legality is a Datalog query, which is fast despite there being many dimensions in each rule. Further, by keeping these policies straightforward and direct, the technique can provide users a reliable view of their security settings. Users can ask questions such as, for example, "which modules can access the door?", "which devices can be accessed after 10 PM?", or "can a user ever access a device?" Each question is a simple Datalog query.

Driver and application modules cannot access sensory data from inaccessible devices. So, only explicitly selected modules have access to, for instance, the camera feed. Additionally, in one embodiment of the technique, the network is treated as another port; so, unless explicitly allowed, driver and application modules cannot relay information from the home to the outside world. Communications between the drivers, service exchange ports and applications occur within the home device management application. (Software upgrades can occur through the home device management application, without modules needing wide-area network access.)

1.2 Exemplary Architecture

Figure 2:
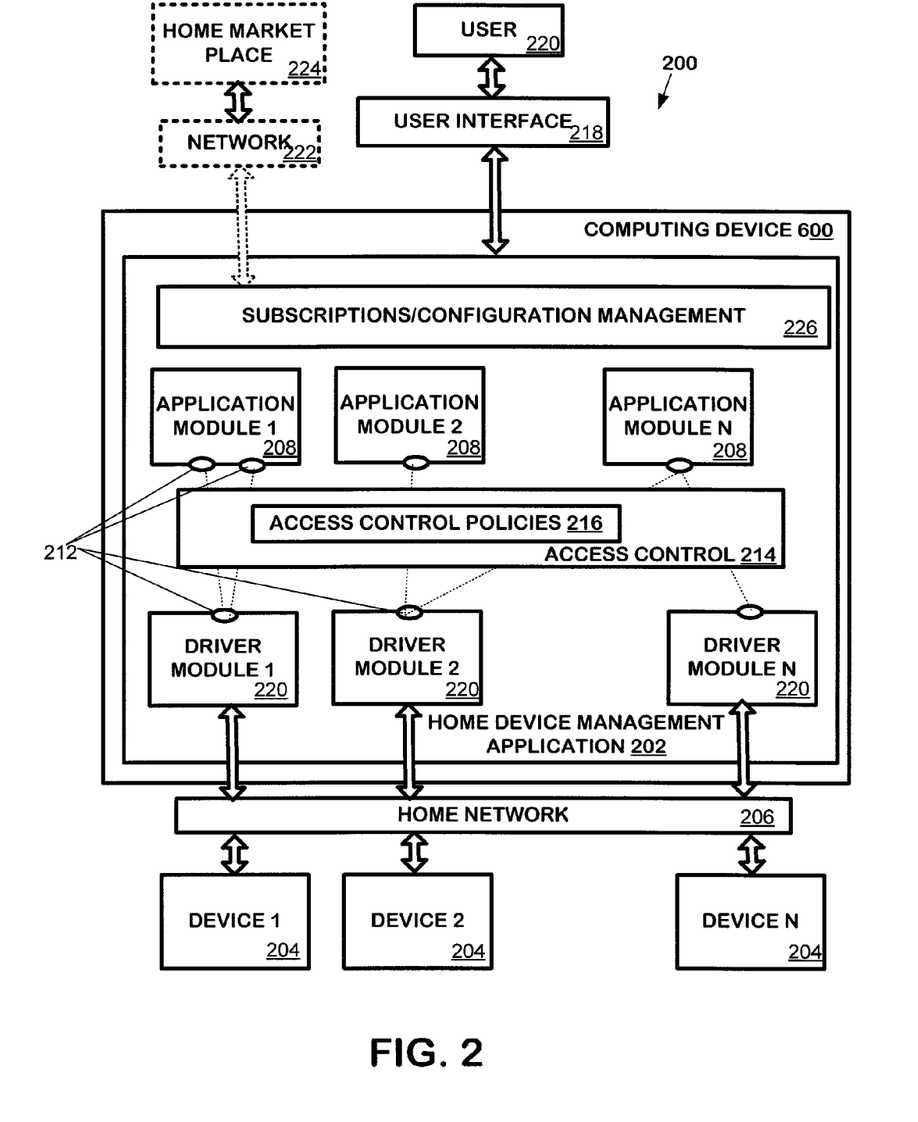
FIG. 2 is an exemplary architecture for employing one exemplary embodiment of the home device management technique described herein.

FIG. 2 depicts an exemplary architecture 200 of one embodiment of the of the home device management technique that allows a user to automatically operate a distributed home device system (a system of networked home devices in the home). A home device management application 202 is installed on a general purpose computing device 600, such as will be described in greater detail with respect to FIG. 6. The home device management application 202 manages an ensemble of distributed home devices 204 connected to a home network 206 which can be hardwired, wireless, or a combination of both. The home device management application 202 employs application modules 208 that implement some functionality in the home preferably by using one or more home devices 204. The home device management application 202 also employs driver modules 220, each driver module abstracting the low level details of an associated home device 204 and connectivity between home devices. The application modules 208 and the driver modules 220 use service exchange ports 212 to interface between them, to communicate between the home devices 204 and to control the operation of home devices. The exemplary architecture 200 also includes an access control module 214 that provides access control policies 216 to limit access to the home devices. In one embodiment the access control policies 216 are based on user input, time, and logic of the application modules. The access control policies 216 determine whether priority should be given to functions executed by one given application module 208 over the functions executed by another given application module. The exemplary architecture 200 also includes a user interface module 218 to allow a user 220 to manage the operation of all of the home devices 204 via the home device application 202.

In one embodiment of this exemplary architecture 200, the driver modules 220 and the application modules 208 can be obtained from a home marketplace 224. The home marketplace 224 can be accessible from a user's computing device with the home device management application 202 installed over the home network 206 or another network 222, which can be, for example, the Internet, a cloud, or a corporate network. The home device marketplace 224 can obtain data on the user's configuration in order to determine device, driver, and application compatibility and interoperability. This configuration is stored by the home device management application 202 in a subscriptions/configuration management module 226 that maintains the configuration of the user's distributed home device system including applicable application modules, driver modules, subscriptions, and service exchange ports. This information is used to determine the interoperability and compatibility of the user's devices, drivers, and applications.

Figure 3:
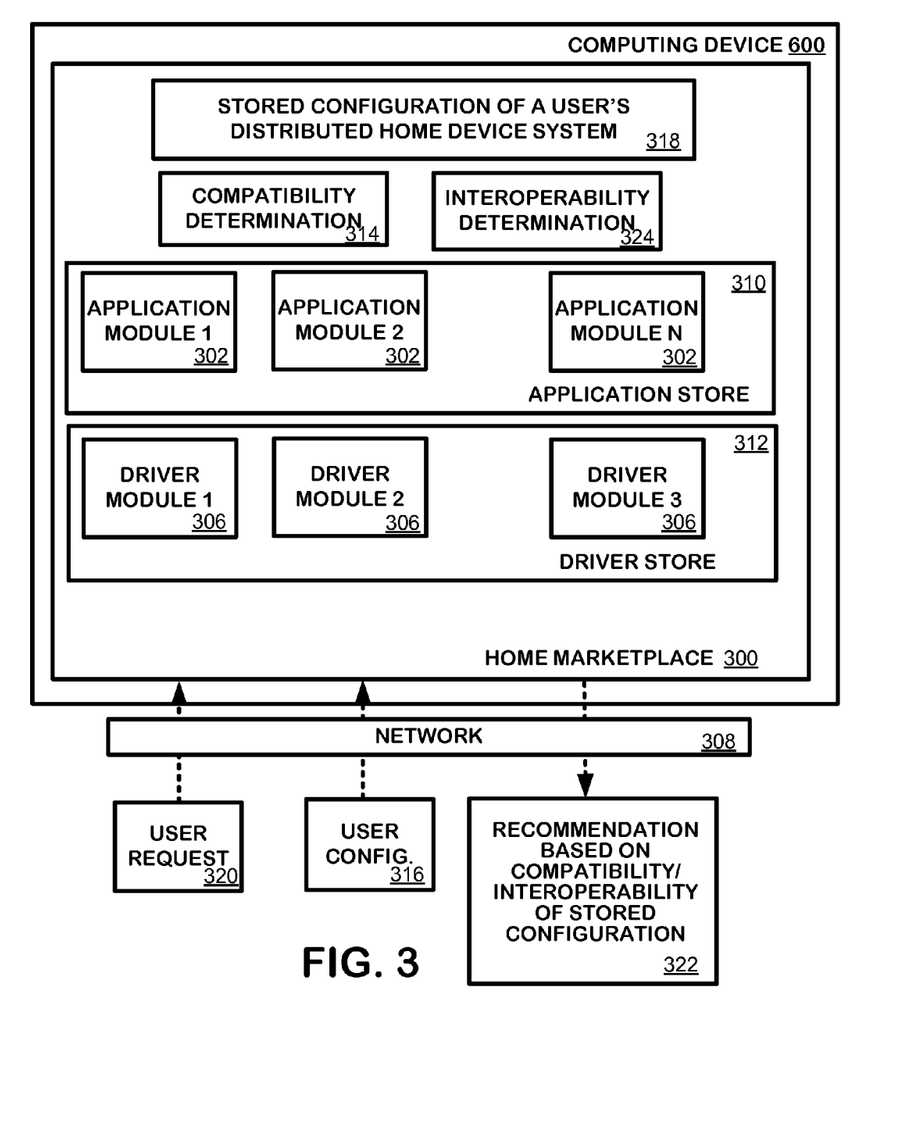
FIG. 3 is an exemplary architecture of a home marketplace that interfaces with a home device management application on a network.

FIG. 3 provides a schematic of an exemplary embodiment of a home marketplace 300. The application modules 302 for home devices (stored in application store 310) and the driver modules 306 (stored in driver store 312) can be obtained from a marketplace 300 over a network 308. Additionally, in one embodiment, one or more home devices can be ordered from the home device marketplace 300 over the network 310. The home marketplace 300 can also determine the compatibility of multiple home devices, as well as determine the compatibility of application modules 302 and driver module 312 with home devices via a compatibility determination module 314. The home marketplace 300 receives information 316 on the home devices users have in their distributed home device system. The information 316 on the user's home devices can be received over the network 308 at the home marketplace 300. The home marketplace 300 can store this information 316 in a database 318 for future reference for use in determining device compatibility and interoperability with a user's application modules and drivers. The home marketplace 300 can then receive a request 320 from a user to obtain an application module 302 (or driver module 306, for that matter) for operating one or more home devices. The home marketplace 300 then can determine the compatibility of the requested application module 302 with the home devices of the user's distributed home device system using the stored configuration 318 in the compatibility determination module 314 and can make a recommendation 322 to the user as to whether the requested application module 302 is compatible with the user's distributed home device system. The compatibility determination module 314 basically determines if the requested application module is compatible with (works with) the devices and drivers in the user's distributed home device system. For example, when a device is installed in a home, and the driver for that device is installed, that driver can export several roles (as discussed previously) through the home device management application. Some drivers may be generic (e.g. "TV") and some may be more specific (e.g. "Sony Bravia TV"). When a user is browsing the marketplace, each application for download or sale will have a manifest that describes the set of roles that it requires (e.g. a TV, or specifically a Sony Bravia TV, or both a Sony Bravia TV and two light bulbs). In one embodiment of the technique, there are then two ways to check compatibility. In the first way, the home device management application exports the home's roles/devices to the marketplace, and the marketplace tests to see if the manifest for a requested application module is satisfied by the home devices in this home. In the second way, the home device management application downloads the application module's manifest and then tests to see if the manifest is satisfied by the devices in the home. This compatibility checking can happen, for example, when a user selects an application to view it, or it can happen in the background (or ahead of time) so that the user is shown only those applications that can be run successfully. The home market place can also suggest to the user what hardware they can buy to make a set of applications work. Likewise the home marketplace 300 can determine the interoperability of the requested application module 302 with other devices and drivers on the user's distributed home device system in an interoperability determination module 322. The interoperability determination module 322 basically determines if the requested application module is interoperable with other application modules for other devices and drivers on the user's distributed home device system.

1.4 Exemplary Process for Employing the Home Device Management Technique

Figure 4:
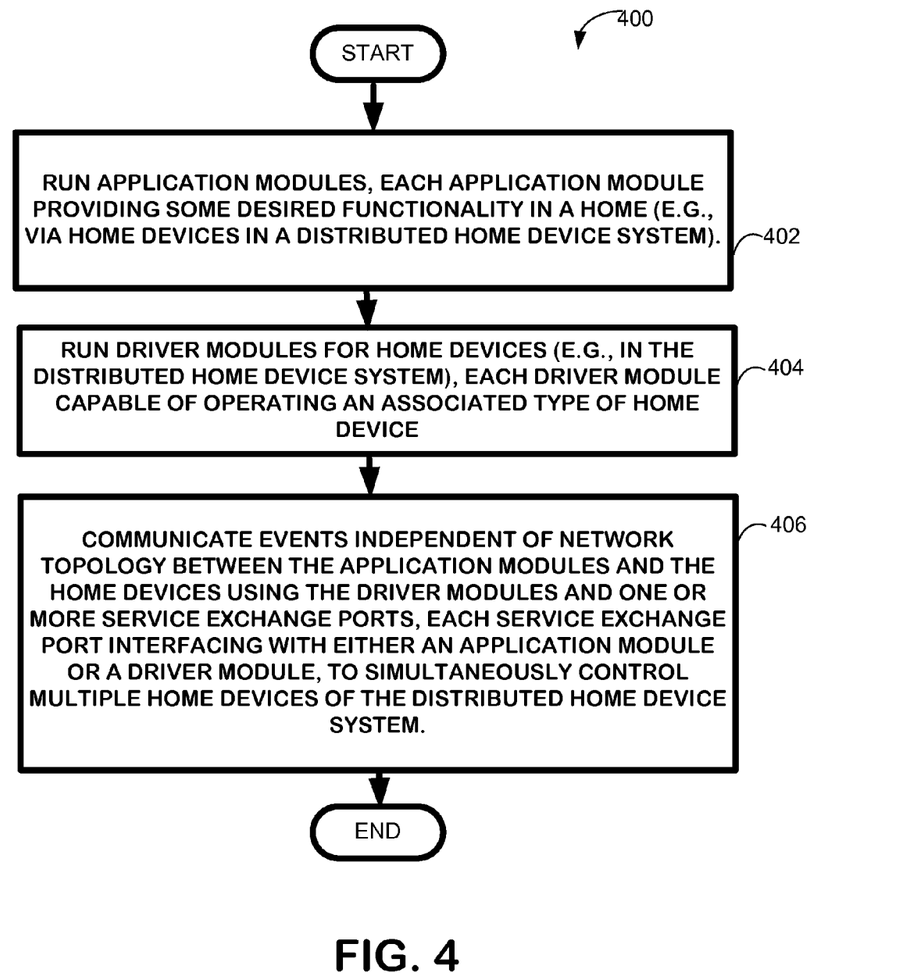
FIG. 4 depicts a flow diagram of an exemplary process for employing one embodiment of the home device management technique.

FIG. 4 and the following paragraphs provide a high level description of an exemplary process for using the home device management technique. It should be understood that in some cases the order of actions can be interchanged, and in some cases some of the actions may even be omitted.

As shown in FIG. 4 block 402, application modules for home devices are created or obtained. Each application module implements some functionality in the home, preferably using one or more devices in a distributed home device system (e.g., home devices connected via a home network to achieve various functions). Any developer can write these application modules and they can be obtained from a home market place as previously discussed. Similarly, driver modules for home devices in the distributed home device system are created or obtained, as shown in block 404. Each driver module provides the logic for operating an associated type of home device. Each driver module is capable of receiving commands from application modules and sending them to devices if needed, detecting events for an associated type of home device, translating the detected event into a format usable by the application modules and notifying the application modules of the events. For example, a television driver module would be able to interface and operate with any type of television. As shown in block 406, events between the application modules and devices are communicated independent of network topology using the driver modules and one or more service exchange ports, each service exchange port interfacing with either an application module or a driver module to simultaneously control multiple home devices of the distributed home device system in accordance with the logic provided by the application module.

In one embodiment of the technique, the process provides a single user interface that allows a user to easily manage the operation of all of the home devices of the distributed home device system.

The computer-implemented process described above can also use access control policies to control access by the application modules to one or more home devices via the service exchange ports. In one embodiment of the home device management technique, the access control policies employ a time parameter and define under which conditions access to one or more home devices is allowed.

As discussed previously, the application modules for the home devices and the driver modules for the home devices can be obtained from a marketplace over a network, as can one or more of the home devices be ordered from a marketplace over the network. The marketplace can also determine the compatibility and interoperability of multiple home devices, as well as determine the compatibility and interoperability of application modules, driver modules, and home devices as discussed above.

2.0 Exemplary User Scenario

Figure 5:
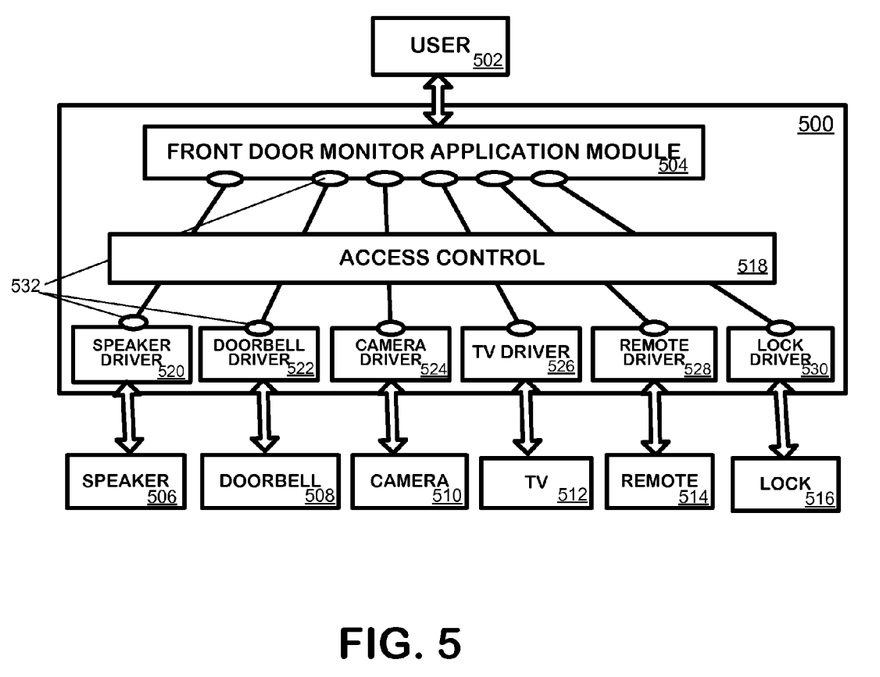
FIG. 5 depicts one exemplary user scenario for using one application module of the home device management technique.

FIG. 5 provides an exemplary user scenario on how the home device management technique can be used to manage a distributed home device system. A user 502, using the home device management application 500, first installs a "front door monitor" application module 504 (for example, which was recommended to the user as being compatible because the application module 504 was listed in the home marketplace as requiring compatible speakers 506, a doorbell 508, camera 510, television 512 (and remote 514), and door lock 516). Once installed the front door monitor application 504 subscribes to notifications about certain events the application 504 is interested in. The notifications are provided by driver modules 520, 522, 524, 526, 528, 530 via the service exchange ports 532. With appropriate access control rules for the relevant devices 518, the front door monitor application 504 runs. Whenever the doorbell 508 rings, the application 504 receives a notification from the doorbell 508, takes a picture via the camera 510, displays it on the TV 512, asks the user 502 if they want to unlock the door with the remote 514, and finally unlocks the door if instructed to do so. Each of these interactions with different devices 506, 508, 510, 512, 514, 516 happens via separate drivers 520, 522, 524, 526, 528 (though the TV and remote driver could conceptually be the same) which are written by potentially different device vendors. Also the home device management application 500 verifies that each access complies with the existing access control rules 518.

From a data flow stand point, a front door manager application 504 can use a doorbell and camera at a front door as well as using speakers and TV in a living room. The front door manager application 504 first subscribes to notifications about the doorbell ringing, then when the doorbell 508 rings, the doorbell driver 522 sends a notification to the front door manager application 504. This notification triggers the application 504 to get the current image from the camera 510 (e.g., a request from the application module 504 and a response back from the camera driver module 524) and query the status of the TV 512 and speakers 506 in the living room (two requests/responses between the application module 504 and the driver modules 526, 520) to see if they were being used. If the TV 512 and/or speakers 506 are in use, the front door monitor application 504 pauses the music, movie, or TV, plays the doorbell sound through the speakers and shows the picture from the camera on the TV. All commands are sent to the relevant driver modules. If none of the devices are in use, the front door application module can instead send an e-mail with the picture attached to the homeowner.

As discussed previously, service exchange ports 532 belonging to the driver modules and (optionally) application modules export services. A service is a list of named operations. Each operation has list of named, typed input parameters and named, typed return values as well as a bit which says if a module can subscribe to the operation. The doorbell may have an operation named "IsRinging" which takes no input parameters and returns a single Boolean (true or false) value which is subscribable.

The home device management application 500 provides mechanisms to list the module(s) 504, the service exchange ports the modules have and the services the service exchange ports 532 provide, as well as method to invoke and/or subscribe to these operations. Therefore, in the above-described scenario, the application module 504 uses the home device management application to subscribe one of its service exchange ports 532 to the "IsRinging" operation of the doorbell driver module's 522 port 532. Then, when the doorbell rings, the driver module 522 uses the home device management application to notify all subscribed service exchange ports 532 of the event by sending the Boolean return value back along with enough information to uniquely identify which service exchange port and operation generated the notification. As previously discussed, such a subscription is described in four parameters: the operation to subscribe to, the service exchange port which would like notifications, a parameter that proves the subscription request is allowed and a parameter that allows the notifications to be sent back.

Also, as previously discussed, a request or query is just an operation invocation, so the module invoking the operation sends the operation it would like to invoke along with the input parameters and the receiving module performs the operation and then sends back the return values. In the example above, the front door monitor application might invoke the camera's "GetImage" operation which has no input parameters and returns an image. Later on, the front door monitor application might invoke the stereo's "Pause" operation which takes no parameters and returns no values and then invoke the TV's "ShowImage" operation which receives a single image parameter and returns nothing.

The calls for the example directly above (omitting the access control/capabilities) can generally be described as follows:

```
DoorManagerApplication calls DoorBellDriver.port1.Subscribe(
    IsRinging, DoorManagerApplication.port1 )
DoorBellDriver calls DoorBellDriver.port1.Notify( IsRinging,
    <return-values> )
HomeDeviceManagementApplication processes this and calls
DoorManagerApplication.port1.Inform( DoorBellDriver.port1,
    IsRinging, <return-values> )
DoorManagerApplication calls TV.port1.Invoke( GetStatus )
DoorManagerApplication calls Speakers.port1.Invoke( GetStatus )
DoorManagerApplication calls Camera.port1.Invoke( GetImage )
The TV and Speakers respond with their status being "in use"
The camera responds with an image
DoorManagerApplication calls Stero.port1.Invoke( Pause )
DoorManagerApplication calls TV.port1.Invoke( ShowImage,
    <image-from-camera> )
DoorManagerApplication calls Speakers.port1.Invoke( Play,
    <doorbell-sound> )
```

3.0 The Computing Environment

The home device management technique is designed to operate in a computing environment. The following description is intended to provide a brief, general description of a suitable computing environment in which the home device management technique can be implemented. The technique is operational with numerous general purpose or special purpose computing system environments or configurations. Examples of well-known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 6:
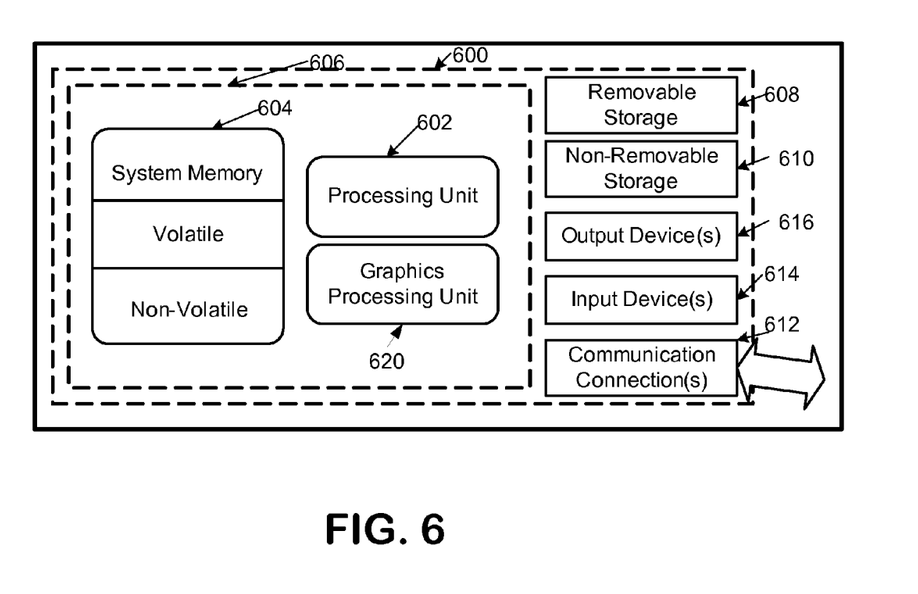
FIG. 6 is a schematic of an exemplary computing device which can be used to practice the home device management technique.

FIG. 6 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 6, an exemplary system for implementing the home device management technique includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Computer readable media include both transitory, propagating signals and computer (readable) storage media. Any such computer storage media may be part of device 600.

Device 600 also can contain communications connection(s) 612 that allow the device to communicate with other devices and networks. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may have various input device(s) 614 such as a display, keyboard, mouse, pen, camera, touch input device, and so on. Output device(s) 616 devices such as a display, speakers, a printer, and so on may also be included. All of these devices are well known in the art and need not be discussed at length here.

The home device management technique may be described in the general context of computer-executable instructions, such as program modules, being executed by a computing device. Generally, program modules include routines, programs, objects, components, data structures, and so on, that perform particular tasks or implement particular abstract data types. The home device management technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for managing a distributed system of home devices on a home network, comprising:
    maintaining a list of service exchange ports that export services, wherein each service exchange port comprises a list of named operations, each operation comprising a list of named, typed input parameters; named, typed return values; and a bit that defines if a driver module or an application module can subscribe to the service exchange port;

running application modules, each application module interfacing with a corresponding service exchange port and providing some desired functionality in a home;

running driver modules for home devices in the distributed home device system on the home network, each driver module interfacing with a corresponding service exchange port and being capable of operating one or more associated type of home device;

communicating events on the home network, independent of network topology, between the application modules and the home devices using the driver modules and corresponding service exchange ports that are not equivalent to a conventional network port, each service exchange port interfacing with either an application module or a driver module and communicating with another service exchange port, to simultaneously control multiple home devices of the distributed home device system on the home network.

2. The computer-implemented process of claim 1 wherein each driver module is capable of receiving commands from one or more application modules and sending the received commands to the home devices, detecting events for an associated type of home device, translating the detected event into a format usable by the application modules and notifying the application modules of the events.

3. The computer-implemented process of claim 1, further comprising using access control policies to control access by the application modules to one or more home devices.

4. The computer-implemented process of claim 3, wherein the access control policies employ time parameters and define under which conditions access to one or more home devices is allowed.

5. The computer-implemented process of claim 1, wherein wherein a service exchange port is defined in terms of roles comprising text strings that express general functionality, and operations comprising actions a service exchange port can carry out with typed inputs and outputs.

6. The computer-implemented process of claim 1 wherein notification for events are subscribed to by the application modules and wherein notification of the events are obtained by monitoring one or more service exchange ports that the application modules are subscribed to.

7. The computer-implemented process of claim 1, further comprising providing a user interface that allows a user to manage the operation of all of the home devices of the distributed home device system.

8. The computer-implemented process of claim 1, further comprising obtaining an application module or a driver module for a home device from a marketplace over a network.

9. The computer-implemented process of claim 1, further comprising obtaining one or more of the home devices from a marketplace over a network.

10. The computer-implemented process of claim 1, further comprising using a market place to determine the compatibility of multiple home devices with each other and to determine the compatibility of at least one home device and a driver.

11. The computer-implemented process of claim 1, further comprising employing a marketplace to recommend at least one of an application module and a home device.

12. A system for automatically operating an ensemble of home devices on a home network, comprising:
a general purpose computing device;
a computer program comprising program modules executable by the general purpose computing device, wherein the computing device is directed by the program modules of the computer program to,
(a) obtain and run application modules, each application module providing some functionality of a home device, using one or more home devices of the ensemble of home devices;
(b) obtain and run driver modules, each driver module abstracting low level details of at least one associated home device and connectivity between the home devices on the home network, wherein each driver module receives commands from one or more application modules and sends the received commands to a home device over the home network, detects events for an associated type of home device and translates the detected event into a format usable by an application module; and
(c) use service exchange ports, one service exchange port corresponding to an application module and one service exchange port corresponding to a driver module, to communicate and exchange services between the application modules and the driver modules via the corresponding service exchange ports independent of network topology of the home network to simultaneously control the operation of the entire ensemble of home devices on the home network, wherein each service exchange port is defined in terms of roles comprising text strings that express general functionality, and operations comprising actions a service exchange port can carry out with typed inputs and outputs.

13. The system of claim 12, wherein an application module subscribes to a subscription of notification of events of the devices the application module controls and wherein notification of the events are obtained by monitoring one or more service exchange ports.

14. The system of claim 13, wherein a subscription comprises:
an operation to subscribe to,
a service exchange port that would like notification,
a parameter that proves the subscription request is allowed, and
a parameter that allows notifications to be sent.

15. The system of claim 13, further comprising a single user interface module to allow a user to manage the operation of all of the home devices of the entire ensemble of home devices on the home network.

16. The system of claim 12, wherein the driver modules and the application modules are obtained from a marketplace.

17. The system of claim 12, wherein the access control policies determine whether priority should be given to functions executed by one given application module over the functions executed by another given application module.

18. A system for providing a marketplace for home devices and driver and application modules over a network, comprising:
a general purpose computing device;
a computer program comprising program modules executable by the general purpose computing device, wherein the computing device is directed by the program modules of the computer program to,
(a) over a network external to a home network, receive information on a configuration of home devices a user has in a distributed home device system on the home network, wherein the distributed home device system comprises:
service exchange ports that export services, defined in terms of roles comprising text strings that express general functionality, and operations comprising actions a service exchange port can carry out, application modules, each application module interfacing with a corresponding service exchange port and providing some desired functionality in the home, driver modules, each driver module interfacing with a corresponding service exchange port and being capable of operating one or more associated type of home device;

(b) receive a request from a user to obtain an application module for operating one or more home devices over the network external to the home network;

(c) determine the compatibility of the requested application module with the home devices of the user's distributed home device system using the received information on the configuration of the home devices; and (d) send to the user over the external network a recommendation as to whether the requested application module is compatible with the user's distributed home device system.

19. The system of claim 18 wherein the information on the configuration of the home devices and the request from the user are received over the external network at the marketplace.

20. The system of claim 18, further comprising a module to recommend to the user other home devices compatible with the user's distributed home device system.

* * * * *